March 19, 1957 A. V. NANNI Re. 24,288

SPEED CHANGING DEVICE

Original Filed July 21, 1954 2 Sheets-Sheet 1

INVENTOR.
Americo V. Nanni

SPEED CHANGING DEVICE

Original Filed July 21, 1954 2 Sheets-Sheet 2

INVENTOR.
Americo V. Nanni

United States Patent Office

Re. 24,288
Reissued Mar. 19, 1957

24,288

SPEED CHANGING DEVICE

Americo V. Nanni, Woodcliff Lake, N. J.

Original No. 2,704,459, dated March 22, 1955, Serial No. 444,783, July 21, 1954. Application for reissue May 18, 1956, Serial No. 585,916

9 Claims. (Cl. 74—63)

Matter enclosed in heavy brackets [ ] appears in the original patent but forms no part of this reissue specification; matter printed in italics indicates the additions made by reissue.

This invention relates to axially-aligned speed changing transmissions and is particularly directed to the problem of eliminating friction and vibration in such transmissions.

The thought of positive power transmission has always been associated with gears. [In] *While such gears may take* many different forms, [but still, in effect, gears,] *such as* discs that have teeth to keep them from slipping when engaging another toothed disc or being engaged by a worm screw [.] , *they are still in effect gears.*

In this application it is proposed to establish that an efficient speed reducer can be constructed by the use of cams and rollers. A mechanism of this type can withstand extremely heavy loads because the pressure is distributed evenly over almost half the circumference of a driven member while at the same time avoiding the wear and loss of power caused by friction of gear teeth.

Speed ratios are the same, generally, as those obtainable with speed reducers of the eccentric planetary type. An undesirable characteristic of the last mentioned speed reducers is that their heavy eccentric rotating masses produce vibration. Efforts to control this vibration have led to the addition of move parts to an already complicated mechanism. Accordingly, it is a further object of this invention to provide an axially-aligned speed reducer that can be constructed without eccentrics.

Other objects of the invention will become apparent upon reading the annexed detailed description in connection with the drawings where:

Figure 1:
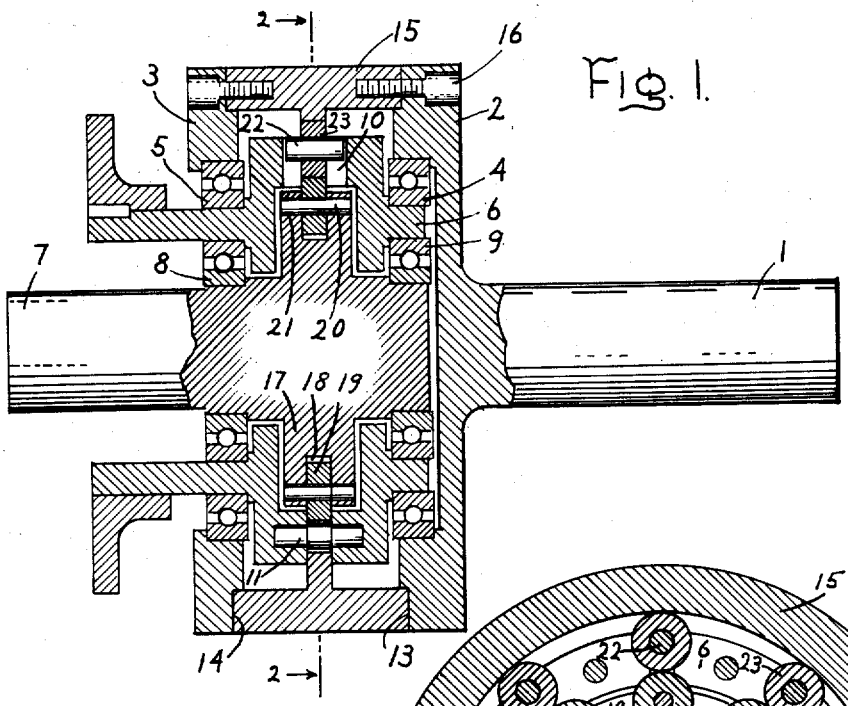
Fig. 1 is a side elevational view, partly in section, of a typical speed reducing transmission unit embodying the principles of the invention.
Figure 2:
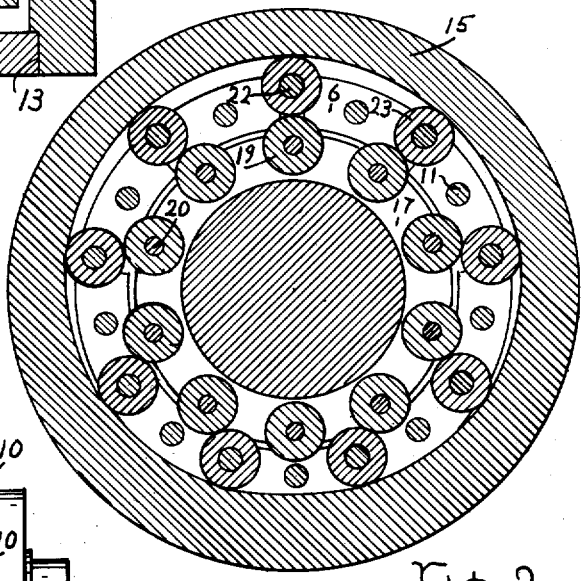
Fig. 2 is a cross section view, taken along line 2—2 of Fig. 1.
Figure 3:
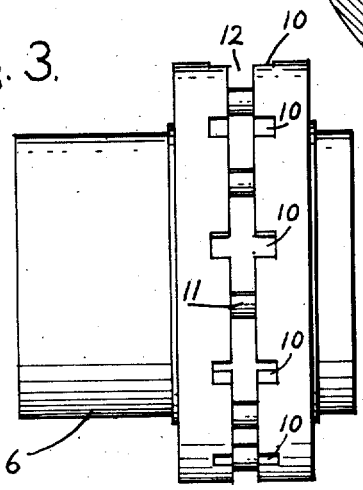

Fig. 3 [shows details of stationary member 6, coupling removed.] *is a side elevational view showing further details of one of the members shown in Figs. 1 and 2; and*

Figure 4:
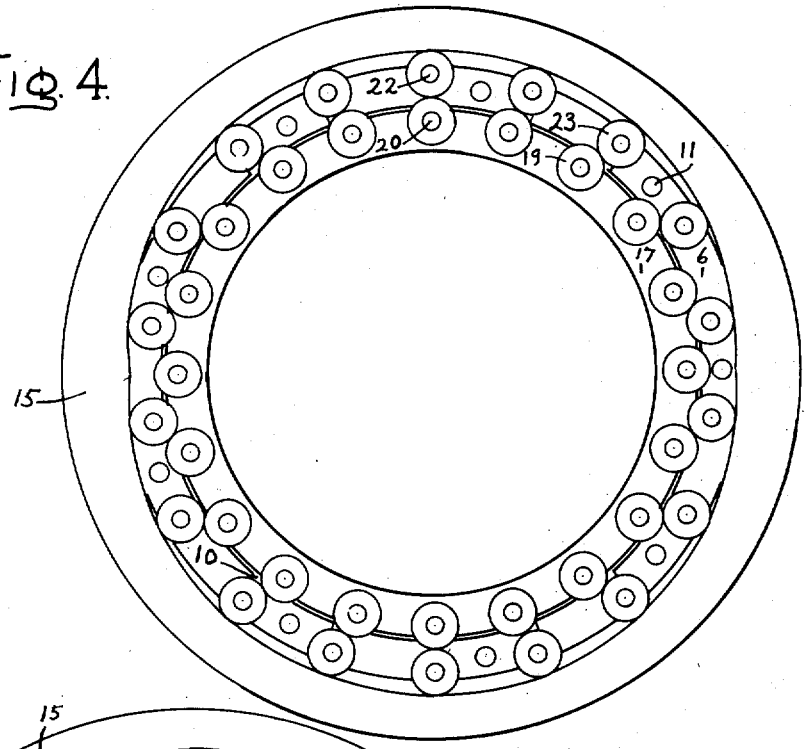
Figure 5:
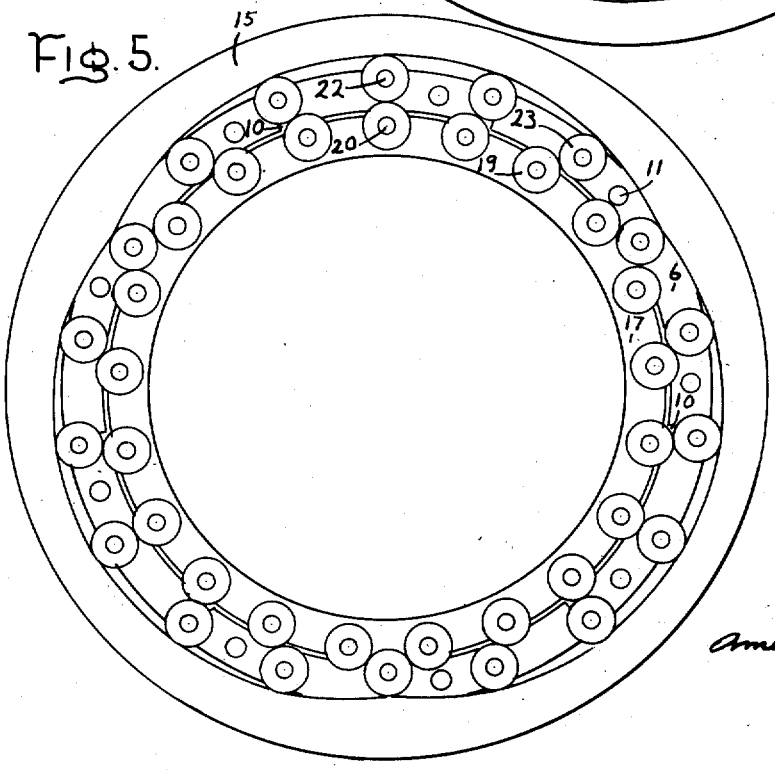

Figs. 4 and 5 are [the same as Fig. 2 except for the number of rollers.] *cross-sectional views similar to Fig. 2 but showing two variations of the embodiment of the invention shown in Figs. 1 and 2.*

Refering now to Fig. 1, there is shown an embodiment of this invention where *a shaft such as the* [drive] *driving* shaft 1 has integral therewith a flange portion 2, a flange 3 being the counterpart of said flange portion 2, each flange respectively journaled in antifriction bearings 4 and 5 on *a member such as a relatively* stationary member 6, and *a shaft such as the* driven shaft 7 jounaled in antifriction bearings 8 and 9 in internal recesses of [same stationary] *the said* member 6.

As shown more clearly in Fig. 3, [stationary] *the* member 6 is made up of two halves for convenience of assembly and also to facilitate machining of *radial* slots 10. These two halves are held together by stepped dowels 11. These dowels also serve to maintain proper space 12 between the two halves.

Returning to Fig. 1, flanges 2 and 3 are recessed at 13 and 14 to receive *a cam such as the* drive cam 15 all three parts firmly held together by socket cap screws 16.

Driven shaft 7 [has on its] *is provided with a* large diameter *flange* 17 *having* a groove 18 [cut deep enough] *of such width and depth* as not to interfere with rotation of rollers 19 [.] *disposed therein freely rotatably journaled on axle pins* 20 *rigidly secured in holes 21 provided in flange 17 of the driven shaft 7. The pins 20 are parallel to and concentric with the common axis of the driving shaft 1 and driven shaft 7 and are equally spaced circumferentially.*

[Pins 20 are parallel to both drive and driving shafts, equidistant from their axes, and spaced equally annularly. They are rigidly secured in holes 21 of driven shaft 7, and each is provided with a freely rotating roller 19.]

A second set of pins 22 also are provided with freely rotating rollers 23. However, this second set of pins 22 are free to roll radially within *the* slots *10* of stationary member 6. Rollers 23 are restrained laterally by the width of space 12 which is just wide enough to permit said rollers 23 to move radially without interference. The number of rollers 19 differ by one or more from rollers 23. *In this embodiment there are ten of the driven rollers 19 and nine of the driving rollers 23 with a resultant drive ratio of 10:1 when the shaft 1 is the driving shaft and the shaft 7 is the driven shaft.*

As can now be seen, by rotating [drive cam] *the driving shaft 1 and the integral cam 15* in either direction, pressure will be applied to rollers 23. As these are confined to radial displacement by grooves 10 of stationary member 6, they will in turn engage rollers 19 and thus impart angular rotation to driven shaft 7.

Thus the transfer and reduction of angular rotation from the [drive] *driving* shaft *1* to the driven shaft *7* is accomplished without any sliding or rubbing motion. All the parts concerned operate by rolling.

*In the embodiment of Fig. 2 the unit number of rollers 19 and the unit number of rollers 23 provide a difference of only one roller and therefore the cam 15 is provided with one generated cam curve. This is useful for some purposes but results in some eccentricity which may be avoided, as will be shown below.*

By referring to Figs. 4 and 5 it will be seen that when the difference between the *unit* number of rollers is more than one, the [eccentric] *eccentricity* [disappears] *may be avoided* and a perfectly balanced, axially aligned, all roller speed reducer is obtained. The [reducer] *embodiment* of Fig. 4 has 18 [drive] *driving* and 20 driven rollers, giving a ratio of 10 to 1. The [reducer] *embodiment* of Fig. 5 has 18 [drive] *driving* and 21 driven rollers, giving a ratio of 7 to 1. When the driven rollers are more in number than the driving rollers, the direction of the output shaft will be the same as that of the input shaft. When the driven rollers are less in number than the driving rollers, the direction of one shaft will be contrary to that of the other.

*As will be evident from the foregoing, the drive ratio in the embodiments illustrated is equal to the ratio between the greater number of rollers of one series and the difference between the number of rollers of the two series. Therefore to ascertain, for a desired ratio, the number of rollers for the two series: take the greater ratio number as the unit number for the driven series of rollers and subtract the lesser ratio number from the greater and the resultant difference will be the unit number for the driving roller series.*

*The following table shows the values for the several embodiments of Figs. 2, 4, and 5, and it will be found convenient in practicing the invention.*

| Desired Drive Ratio | Unit Number of Rollers | | No. of Generated Curves |
|---|---|---|---|
| | Driven | Driving | |
| 10:1 | 10 | 10—1=9 | 1 (Fig. 2). |
| 10:1 | 20 | 18 | 2 (Fig. 4). |
| 7:1 | 21 | 18 | 3 (Fig. 5). |

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A speed changing device comprising, a driving shaft, a driven shaft, a plurality of unattached members, a stationary member adapted to guide said unattached members in radial movement toward an axis common to both driving and driven shafts, said driven shaft carrying a plurality of engaging members equidistant from its axis, equally spaced [annularly] *circumferentially,* adapted to come in contact with said unattached members, and differing in number from said unattached members, and said driving shaft carrying a cam adapted to urge radial displacement upon said unattached members for the purpose of imparting angular rotation to said driven shaft.

2. A speed changing device comprising, a stationary member having a plurality of apertures extending radially and equally spaced annularly, a corresponding number of engaging members adapted to travel radially within said apertures, a driven shaft rotatably placed in concentricity with said stationary member and carrying a plurality of engaging members equidistant from its axis and equally spaced [annularly] *circumferentially,* said engaging members differing in number from the apertures in said stationary member, and adapted to come in contact with engaging members traveling radially within apertures of stationary member, a driving shaft rotatably placed in concentricity with driven shaft, and carrying a cam adapted to urge radial displacement upon said engaging members in apertures of said stationary member, said radial displacement for the purpose of imparting angular rotation to driven shaft.

3. A speed changing device comprising a stationary member having a plurality of rectangular grooves extending radially and equally spaced [annularly] *circumferentially,* a corresponding number of pins adapted to roll freely in radial direction within said grooves, each pin carrying a freely rotating roller, said stationary member rotatably supporting on both ends of its outer periphery two flanges, an internal cam supported between said flanges and rotating therewith, and adapted to urge radial displacement upon rollers guided by rectangular grooves of stationary member, a driven shaft running within said stationary member and rotatably supported in recesses in both ends of said stationary member and carrying a plurality of pins, said pins being parallel to the driven shaft, equidistant from its axis and spaced equally [annularly] *circumferentially,* each carrying a freely rotating roller, and differing in number from grooves in said stationary member, said rollers adapted to come in contact with said radially displaced rollers for the purpose of imparting angular rotation to said driven shaft.

*4. A speed changing device comprising three coaxial members mounted for relative rotational movement, a first series of rollers mounted on one of said members with their axes of rotation equally circumferentially spaced and fixed equidistant from the axis common to said members, and a second series of rollers mounted on another of said members with their axes of rotation equally circumferentially spaced and movable in a radial direction relative to said common axis into and out of driving engagement with the rollers of said first series, the rollers of said first and second series differing in number, the third of said members being provided with a cam surface in operative engagement with the rollers of said second series and adapted to urge radial displacement of the rollers of said second series, whereby upon relative rotational movement between said cam member and said member carrying said second series of rollers relative angular rotation is produced between the said roller carrying members.*

*5. A speed changing device comprising three coaxial members mounted for relative rotational movement, a first series of rollers mounted on one of said members with their axes of rotation equally circumferentially spaced and fixed equidistant from the axis common to said members, and a second series of rollers mounted on another of said members with their axes of rotation equally circumferentially spaced and movable in a radial direction relative to said common axis into and out of driving engagement with the rollers of said first series, the rollers of said first and second series differing in number, the third of said members being provided with a cam surface in operative engagement with the rollers of said second series and adapted to urge radial displacement of the rollers of said second series, whereby upon relative rotational movement between said cam member and said member carrying said second series of rollers, angular rotation is imparted to one of said roller carrying members by the other of said roller carrying members, the drive ratio being the ratio between the number of rollers of one series and the difference between the number of rollers of the two series.*

*6. A speed changing device comprising three coaxial members mounted for relative rotational movement, a first series of rollers mounted on one of said members with their axes of rotation equally circumferentially spaced and fixed equidistant from the axis common to said members, and a second series of rollers mounted on another of said members with their axes of rotation equally circumferentially spaced and movable in a radial direction relative to said common axis into and out of driving engagement with the rollers of said first series, the rollers of said first and second series differing in number, the third of said members being provided with a cam, said radially movable rollers being disposed intermediate said cam and said radially fixed rollers with the cam surface in operative engagement with said radially movable rollers and adapted to urge radial displacement thereof into driving engagement with said radially fixed rollers, whereby upon relative rotational movement between said cam member and said member carrying said radially movable rollers relative angular rotation is produced between the said roller carrying members.*

*7. A speed changing device comprising three coaxial members mounted for relative rotational movement one with respect to the other, a first series of rollers mounted on one of said members with their axes of rotation equally circumferentially spaced and fixed equidistant from and parallel to the axis common to said members, and a second series of rollers mounted on another of said members with their axes of rotation parallel to said common axis and equally circumferentially spaced and movable in a radial direction relative to said common axis into and out of driving engagement with the rollers of said first series, the rollers of said first and second series differing in number, the third of said members being provided with a cam surface in operative engagement with the rollers of said second series and adapted to urge radial displacement of the rollers of said second series, whereby upon relative rotational movement between said cam member and said member carrying said radially movable second series of rollers said radially movable rollers are moved into operative engagement with the radially fixed rollers of said*

*first series to thereby cause relative rotational movement between said roller carrying members.*

*8. A speed changing device comprising three coaxial members mounted for relative rotational movement, a first series of rollers freely rotatably mounted on one of said members with their axes of rotation equally circumferentially spaced and fixed equidistant from the axis common to said members, and a second series of rollers freely rotatably mounted on axles carried by another of said members, said axles being equally circumferentially spaced and guided for rolling movement in a radial direction relative to said common axis to thereby carry rollers of said second series into and out of driving engagement with the rollers of said first series, the rollers of said first and second series differing in number, the third of said members being provided with a cam surface in operative engagement with the rollers of said second series and adapted to urge radial displacement of the rollers of said second series, whereby upon relative rotational movement between said cam member and said member carrying said second series of rollers said cam exerts radial force against the rollers of the second series to thereby simultaneously rotate the rollers of the second series about their respective axles and roll said axles in a radial direction into driving engagement with rollers of the first series and cause relative angular rotation between said roller carrying members.*

*9. A speed changing device comprising three coaxial members mounted for relative rotational movement one with respect to the other, a first series of rollers mounted*

*on one of said members with their axes of rotation equally circumferentially spaced and fixed equidistant from the axis common to said members, and a second series of rollers mounted on another of said members with their axes of rotation equally circumferentially spaced and movable in a radial direction relative to said common axis into and out of driving engagement with the rollers of said first series, said second series of rollers being freely rotatably mounted on axles disposed for freely rolling engagement in radially extending slots, the rollers of said first and second series differing in number, the third of said members being provided with a cam surface in operative engagement with the rollers of said second series and adapted to urge radial displacement of the rollers of said second series, whereby upon relative rotational movement between said cam member and said member carrying said second series of rollers the said second series are rotated on their respective axles and said axles are caused to roll radially in said slots to move the rollers carried thereby into operative rolling engagement with the freely rotatable radially fixed axis rollers of said first series, to thereby cause relative rotational movement between said roller carrying members.*

References Cited in the file of this patent or the original patent

UNITED STATES PATENTS

| | | |
|---|---|---|
| 1,543,791 | Pitter | June 30, 1925 |
| 2,049,122 | Kuba | July 28, 1936 |